(12) United States Patent
Gordon et al.

(10) Patent No.: US 12,061,166 B2
(45) Date of Patent: Aug. 13, 2024

(54) ION DETECTOR

(71) Applicant: Micromass UK Limited, Wilmslow (GB)

(72) Inventors: David Gordon, Middlewich (GB); Daniel James Kenny, Knutsford (GB); Richard Barrington Moulds, Stockport (GB); David J. Langridge, Mcclesfield (GB)

(73) Assignee: Micromass UK Limited, Wilmslow (GB)

(*) Notice: Subject to any disclaimer, the term of this patent is extended or adjusted under 35 U.S.C. 154(b) by 545 days.

(21) Appl. No.: 17/286,180

(22) PCT Filed: Oct. 22, 2019

(86) PCT No.: PCT/GB2019/053008
§ 371 (c)(1),
(2) Date: Apr. 16, 2021

(87) PCT Pub. No.: WO2020/084296
PCT Pub. Date: Apr. 30, 2020

(65) Prior Publication Data
US 2021/0382005 A1 Dec. 9, 2021

(30) Foreign Application Priority Data
Oct. 22, 2018 (GB) .................................. 1817145

(51) Int. Cl.
*G01N 27/622* (2021.01)
*H01J 49/00* (2006.01)
*H01J 49/02* (2006.01)

(52) U.S. Cl.
CPC ........ *G01N 27/622* (2013.01); *H01J 49/0095* (2013.01); *H01J 49/025* (2013.01)

(58) Field of Classification Search
CPC .... H01J 49/025; H01J 49/067; H01J 49/0095; G01N 27/622; G01T 1/28; G01T 1/185; G01T 1/2006
See application file for complete search history.

(56) References Cited

U.S. PATENT DOCUMENTS 4,810,882 A * 3/1989 Bateman ................. H01J 49/32
250/397
6,025,590 A 2/2000 Itoi
(Continued)

FOREIGN PATENT DOCUMENTS

| CN | 1773268 A | 5/2006 |
|---|---|---|
| CN | 102385064 A | 3/2012 |

(Continued)

OTHER PUBLICATIONS

International Search Report and Written Opinion for International Application No. PCT/GB2019/053008, mailed Jan. 20, 2020.
(Continued)

*Primary Examiner* — David E Smith
*Assistant Examiner* — Hsien C Tsai
(74) *Attorney, Agent, or Firm* — Goodwin Procter LLP

(57) ABSTRACT

A dual-mode ion detector for a mass and/or ion mobility spectrometer comprising a first conversion electrode (20) that is maintained, in use, at a negative potential and arranged for converting incident positive ions (32) into secondary electrons (34), and a second conversion electrode (22) that is maintained, in use, at a positive potential and arranged for converting incident negative ions (42) into secondary positive ions (44) and/or secondary electrons (74). The detector also comprises an electron detecting surface (26) and an entrance electrode (24) for drawing ions
(Continued)

into the ion detector. The ion detector is switchable between a first mode for detecting positive ions and a second mode for detecting negative ions.

19 Claims, 5 Drawing Sheets

(56) References Cited

U.S. PATENT DOCUMENTS

| | | | |
|---|---|---|---|
| 6,057,545 | A | 5/2000 | Sugiyama |
| 6,373,052 | B1 | 4/2002 | Hoyes et al. |
| 7,728,292 | B2 | 6/2010 | Joliffe et al. |
| 8,164,069 | B2 | 4/2012 | Uchiyama et al. |
| 8,866,071 | B2 | 10/2014 | Kotani et al. |
| 2004/0262531 | A1 | 12/2004 | Gerlach et al. |
| 2009/0294654 | A1 | 12/2009 | Steiner |
| 2012/0025085 | A1* | 2/2012 | Kotani ............ G01T 1/28 250/361 R |
| 2013/0187057 | A1 | 7/2013 | Kobayashi et al. |

FOREIGN PATENT DOCUMENTS

| | | |
|---|---|---|
| CN | 103227097 A | 7/2013 |
| EP | 3951833 A1 | 2/2022 |
| FR | 2658361 A1 | 8/1991 |
| JP | S5838446 A | 3/1983 |
| JP | H07326315 A | 12/1995 |
| JP | H10154483 A | 6/1998 |

OTHER PUBLICATIONS

Search Report for GB Application No. GB1817145.4, mailed Mar. 28, 2019.
Combined Search and Examination Report for GB Application No. GB1915290.9, mailed Apr. 23, 2020.
Communication under Rule 71(3) EPC for European Patent Application No. 19797334.0, mailed Apr. 16, 2024.

* cited by examiner

ION DETECTOR

CROSS-REFERENCE TO RELATED APPLICATIONS

This application is a U.S. national phase filing claiming the benefit of and priority to International Patent Application No. PCT/GB2019/053008, filed Oct. 22, 2019, which claims priority from and the benefit of United Kingdom patent application No. 1817145.4 filed on Oct. 22, 2018. The entire contents of these applications are incorporated herein by reference.

FIELD OF THE INVENTION

The present invention relates generally to ion detectors for use within mass and/or ion mobility spectrometers, and particularly to dual-mode ion detectors capable of detecting both positive and negative ions.

BACKGROUND

Within a mass and/or ion mobility spectrometer it is necessary to be able to reliably and sensitively detect ions after they have been separated or analysed. Many instruments are capable of operating in both positive ion and negative ion mode, e.g. depending on how the ion source is configured. Thus, it is desirable to be able to detect both positive and negative ions using a single so-called "dual-mode" (or "dual-polarity") ion detector that can be switched, e.g. along with the instrument and/or ion source, in order to detect either positive or negative ions depending on the operating mode. However, existing dual-mode ion detectors may suffer from various problems. Accordingly, it is desired to provide improved dual-mode ion detectors.

SUMMARY

From a first aspect, there is provided a dual-mode ion detector for a mass and/or ion mobility spectrometer, the detector comprising:

a first conversion electrode that is maintained, in use, at a negative potential and arranged for converting incident positive ions into secondary electrons;

a second conversion electrode that is maintained, in use, at a positive potential and arranged for converting incident negative ions into secondary positive ions and/or secondary electrons;

an electron detecting surface; and an entrance electrode for drawing ions into the ion detector, wherein the ion detector is switchable between a first mode for detecting positive ions and a second mode for detecting negative ions, wherein in the first mode a negative voltage is applied to the entrance electrode to draw incoming positive ions into the ion detector so that an incoming positive ion is drawn into the ion detector by the entrance electrode and is then accelerated towards and caused to initially strike the first conversion electrode to create secondary electrons, whereas in the second mode a positive voltage is applied to the entrance electrode to draw incoming negative ions into the ion detector so that an incoming negative ion is drawn into the ion detector and is then accelerated towards and caused to initially strike the second conversion electrode to create secondary positive ions and/or secondary electrons, wherein the first conversion electrode is arranged and shaped so that secondary electrons created by positive ions striking the first conversion electrode are then caused to strike the electron detecting surface, and wherein:

(i) the second conversion electrode is arranged and shaped so that secondary positive ions created by negative ions striking the second conversion electrode are then caused to strike the first conversion electrode to create secondary electrons which are in turn caused to strike the electron detecting surface, and/or (ii) the second conversion electrode is arranged and shaped so that secondary electrons created by negative ions striking the second conversion electrode are then caused to strike the electron detecting surface.

The ion detector is thus capable of switching between a first mode for detecting positive ions and a second mode for detecting negative ions wherein the switching between the first and second modes can be controlled by applying a suitable voltage to the entrance electrode to cause ions of the desired polarity to pass into the ion detector. In this way the control electronics for switching the ion detector can be simplified.

For example, compared to an arrangement wherein the voltage applied to one of the conversion electrodes is switched, by providing an entrance electrode, the ion detector can be switched between positive and negative ion detection modes without necessarily having to adjust the relatively higher voltages required by the conversion electrodes. The first and second conversion electrodes can thus be maintained at their respective potentials, with the entrance electrode then being used to provide a local field for initially drawing ions into the detector, with this local field being set to attract either positive or negative ions into the detector depending on the operating mode.

This means that it is not necessary to provide switchable high voltage power supplies, which are typically relatively large and expensive, for the conversion electrodes, and the power supplies for the conversion electrodes can thus be kept relatively simple.

On the other hand, because the entrance electrode is used (only) for creating a local "draw-in" field for attracting ions of the desired polarity into the ion detector, and this can be achieved using relatively lower voltages, the entrance electrode does not require a high voltage power supply.

Furthermore, the voltage applied to the entrance electrode can be switched relatively quickly, and more stably, e.g. than the high voltages that are applied to the conversion electrodes.

Thus, as well as reducing the cost and complexity of the control electronics, the use of such an entrance electrode may in turn also provide for an improved performance (e.g. in terms of switching speed).

Also, because the first and second conversion electrodes see the same polarity of ions in both modes, these electrodes can configured appropriately for the desired ion-to-ion and ion-to-electron conversions, potentially allowing for improved detector sensitivity.

For instance, the first conversion electrode is generally configured in both modes so that a positive ion striking upon the surface of the first conversion electrode with sufficiently high kinetic energy generates (is "converted" into) one or more secondary electrons (and typically a single ion strike may generate a plurality of secondary electrons so that the signal is effectively amplified within the detector). To provide the kinetic energy required for the desired ion-toelectron conversion the first conversion electrode may thus be held at a relatively high negative potential.

For example, the first conversion electrode may be maintained, in use, at an absolute potential that is higher than about: (i) 1 kV; (ii) 5 kV, (iii) 7.5 kV, or (iv) 10 kV. (That is, the first conversion electrode may be maintained at a negative potential that is less than: (i) −1 kV; (ii) −5 kV; (iii) −7.5 kV; or (iv) −10 kV.) The potential of the first conversion electrode can thus be selected, as desired, to promote the desired conversion of positive ions into secondary electrons.

Furthermore, because the first conversion electrode is used in both operating modes (only) for converting positive ions into secondary electrons, the surface of the first conversion electrode can be designed (optimised) for this purpose. For example, the surface of the first conversion electrode may suitably be coated with a material that promotes the conversion of positive ions into secondary electrons.

Similarly, the second conversion electrode is generally configured in both modes so that a negative ion striking upon the surface of the second conversion electrode with sufficiently high kinetic energy generates (is "converted" into) one or more secondary positive ions and/or one or more secondary electrons. Again, the second conversion electrode may therefore be held at a relatively high absolute potential, e.g. higher than about: (i) 1 kV; (ii) 5 kV, (iii) 7.5 kV, or (iv) 10 kV. The potential of the second conversion electrode may generally be set independently of the potential of the first conversion electrode. As with the first conversion electrode, the potential of the second conversion electrode may be set suitably for promoting the desired ion to ion conversions and/or ion to electron conversions. Also, again, because the second conversion electrode acts in both operating modes in the same way, i.e. either to convert negative ions into secondary positive ions or to convert negative ions into secondary electrons (or some combination of both), the surface of the second conversion electrode may be designed (optimised) for either or both of these purposes, e.g. by providing a suitable coating or finish on the surface of the second conversion electrode. Various suitable surface coatings are known to those skilled in the art.

Thus, the surface materials of the first and second conversion electrodes, as well as the potentials applied to the first and second conversion electrodes (relative to the electron detecting surface), can be selected (optimised) for their respective functions, which are the same in both operation modes. In this way, by appropriately configuring the first and second conversion electrodes for their respective purpose, it may be possible to improve the quantum efficiency (and hence sensitivity) of the detector.

Furthermore, because the switching between modes is performed using the entrance electrode, the potentials on the first and/or second conversion electrode(s) can be (substantially) fixed in use. That is, once the potentials have been set as desired for achieving the desired ion-to-ion and ion-to-electron conversions, the potentials can then be left alone. Thus, as mentioned above, this means that it is not necessary to switch the relatively high potentials applied to the conversion electrodes, which allows for the use of simpler (e.g. static) power supplies for the conversion electrodes. However, it is also contemplated there may still be some (fine) adjustment of the voltages applied to the conversion electrodes (but still without having to switch their polarity).

By contrast, the voltage(s) that are applied to the entrance electrode may be relatively lower. For instance, the entrance electrode is used to attract the ions into the high field region of the ion detector between the conversion electrodes. The entrance electrode thus only needs to create a local electric field that acts to draw ions into the ion detector and this can be achieved with relatively lower potentials, e.g. of the order 1 kV, or even lower. For example, the voltage applied to the entrance electrode may be switched between +/− a few hundred V depending on the polarity of the incoming ions.

In embodiments, the entrance electrode may comprise a ring electrode. Incoming ions can thus be drawn into the ion detector by the ring electrode, and then pass through a central aperture of the ring electrode into the high field region between the conversion electrodes wherein the ions then follow the desired trajectories onto the detection surface. However, any suitable entrance electrode (or set of electrodes) may be used as the entrance electrode.

The entrance electrode may comprise an electrostatic lens. The entrance electrode may thus provide some initial focussing of the ions (e.g. along a central axis of the detector).

In embodiments, a controller is provided that is operable to switch the ion detector between the first and second modes of operation by changing a voltage applied to the entrance electrode. This can be achieved relatively quickly. For example, in embodiments, the ion detector may be switched between the first and second modes of operation with a timescale of less than 1 millisecond.

The entrance electrode thus acts, depending on the operating mode, to cause incoming ions of either positive or negative polarity to be initially drawn into the ion detector. The ions are thus drawn by the entrance electrode into the high field region between the conversion electrodes, where they are then accelerated due to the voltages applied to the conversion electrodes towards either the first or second conversion electrode (depending on their polarity).

The potential difference between the entrance electrode and the conversion electrodes is such that ions are accelerated forcefully onto the conversion electrodes, e.g. in order to promote the desired ion-to-ion or ion-to-electron conversions. Thus, there should be a relatively large potential difference between the potential at the entrance electrode and that at the conversion electrodes. For example, the potential difference between the entrance electrode and the conversion electrode(s) in both operating modes may be greater than about: (i) 1 kV; (ii) 5 kV, (iii) 7.5 kV, or (iv) 10 kV.

Ions may generally be provided to the ion detector (e.g. from an upstream analytical component of a mass and/or ion mobility spectrometer) through an ion entrance. The ions will generally be provided along a primary axis of the ion detector. The entrance electrode may be arranged substantially at, or near to, the ion entrance. The entrance electrode may be arranged along the primary axis along which ions are provided to the ion detector.

The first conversion electrode and the second conversion electrode may be arranged substantially facing each other on either side of the entrance electrode. The first and second conversion electrodes may be substantially symmetrically arranged opposite one another (and e.g. spaced apart perpendicularly of the primary axis along which ions are provided to the ion detector). However, other arrangements would of course be possible.

The first conversion electrode and the second conversion electrode may be shaped to cause ions and electrons to tend to follow the desired trajectories. For example, the first and/or second conversion electrodes may each comprise angled portions that act to direct the secondary ions and electrons resulting from ions striking these angled portions to ultimately impact upon the electron detecting surface of the ion detector. So, for instance, incoming ions may be initially directed to strike an angled portion of the respective first or second conversion electrode, depending on the operating mode.

For example, in the first mode, a positive ion may initially strike an angled portion of the first conversion electrode to create secondary electrons that are then directed onto the electron detecting surface.

Similarly, in the second mode, a negative ion may initially strike an angled portion of the second conversion electrode to create: (i) secondary positive ions that are then directed onto an angled portion of the first conversion electrode to create secondary electrons that are then directed onto the electron detecting surface; and/or (ii) secondary electrons that are then directed onto the electron detecting surface.

The secondary electrons generated by the first conversion electrode are ultimately passed to an electron detecting surface. A signal is thus generated in response to the secondary electrons impacting upon the electron detecting surface (with this signal thus being (indirectly) associated with the original incoming ion that led to the creation of the secondary electrons). (That is, a signal is generated in response to an incoming ion, even though it is only indirectly generated by the ion, e.g. by the secondary ions/electrons.)

In general any suitable electron detecting surface may be used. For example, the electron detecting surface may comprise a metallic anode array, or similar, that is capable of detecting incident electrons and generating an associated signal. However, in embodiments, the electron detecting surface comprises a light emitting material. Electrons impacting on the electron detecting surface thus create photons which can then be detected by a suitable photo sensitive detector, such as a photomultiplier tube. For example, the light emitting material may be provided on a transparent surface (e.g. a glass slide) with a photo sensitive detector (e.g. photomultiplier tube) positioned below this surface to detect the resulting photons.

Thus, in embodiments, the electron detecting surface is coated with a light emitting material such as a phosphor coating. An yttrium silicate P47 phosphor coating may suitably be used. However, in general, any suitably light emitting (e.g., phosphorescent or fluorescent, or semiconductor based) material may be used and the skilled person will be aware of various examples of suitable light emitting materials that may be used within an ion detector of the type described herein.

The electron detecting surface may in embodiments comprise a surface of the second conversion electrode. For example, the second conversion electrode may comprise a flat substantially central portion including the electron detecting surface (which central portion is surrounded by, e.g. angled portions as described above that are arranged to promote the desired ion-to-ion conversions).

However, other arrangements would of course be possible. For instance, by suitably arranging and shaping the first conversion electrode, the first conversion electrode may alternatively be arranged to direct the secondary electrons onto an electron detecting surface that is adjacent to the second conversion electrode, or even completely separate from the second conversion electrode.

The electron detecting surface may generally be maintained at a potential that is greater than or equal to the potential of the second conversion electrode. This may depend on the relative arrangement of the electron detecting surface and the second conversion electrode.

For example, when the electron detecting surface comprises a surface of the second conversion electrode, the electron detecting surface may generally be maintained at the same potential as the second conversion electrode. On the other hand, in embodiments where the second conversion electrode is provided separately from the electron detecting surface, the electron detecting surface may be held at a relatively higher potential than the second conversion electrode, e.g. in order to draw secondary electrons generated by the second conversion electrode towards the electron detecting surface. In embodiments, the electron detecting surface may be maintained at an absolute potential higher than about: (i) 1 kV; (ii) 5 kV, (iii) 7.5 kV, or (iv) 10 kV.

The ion detector may comprise a vacuum housing, wherein the first and second conversion electrodes, the power supplies for the first and second conversion electrodes and the electron detecting surface, the entrance electrode and the electron detecting surface are contained within the vacuum housing. Thus, in use, the ion detector may be maintained under vacuum pressure. For instance, the ion detector may be maintained in use at a pressure less than about: (i) $10^{-4}$ mbar, (ii) $10^{-5}$ mbar, or (iii) $10^{-6}$ mbar.

However, other arrangements are also contemplated. For instance, the entrance electrode may be provided as part of the detector housing, or even outside of the vacuum housing, whilst still acting to draw ions into the region of the detector between the first and second conversion electrodes. Similarly, at least some of the power supplies may be provided outside of the vacuum housing.

When a photo sensitive detector such as a photo multiplier tube is used this may also be provided within the vacuum housing. Alternatively, a light guide may be used for transferring photons generated by the electron detecting surface out of the vacuum housing towards the photo sensitive detector.

From a second aspect, there is provided a method of detecting ions using a dual-mode ion detector comprising: a first conversion electrode arranged for converting incident positive ions into secondary electrons; a second conversion electrode arranged for converting incident negative ions into secondary positive ions and/or secondary electrons; an electron detecting surface; and an entrance electrode to which a potential can be applied to draw incoming ions into the ion detector, the method comprising:

maintaining the first conversion electrode at a negative potential;

maintaining the second conversion electrode at a positive potential; and operating the ion detector either in a first mode for detecting positive ions or a second mode for detecting negative ions, wherein:

in the first mode a negative potential is applied to the entrance electrode so that incoming positive ions are drawn into the ion detector and caused to initially strike the first conversion electrode to create secondary electrons, the method comprising detecting the secondary electrons using the electron detecting surface; and in the second mode a positive potential is applied to the entrance electrode so that:

(i) incoming negative ions are drawn into the ion detector and caused to initially strike the second conversion electrode to create secondary positive ions, the method comprising converting the secondary positive ions into secondary electrons using the first conversion electrode, and then detecting the secondary electrons using the electron detecting surface; and/or (ii) incoming negative ions are drawn into the ion detector caused to initially strike the second conversion electrode to create secondary electrons, the method comprising detecting the secondary electrons using the electron detecting surface.

The ion detector may be provided as part of a mass analyser, a mass spectrometer and/or an ion mobility spectrometer.

The spectrometer disclosed herein may comprise an ion source selected from the group consisting of: (i) an Electrospray ionisation ("ESI") ion source; (ii) an Atmospheric Pressure Photo Ionisation ("APPI") ion source; (iii) an Atmospheric Pressure Chemical Ionisation ("APCI") ion source; (iv) a Matrix Assisted Laser Desorption Ionisation ("MALDI") ion source; (v) a Laser Desorption Ionisation ("LDI") ion source; (vi) an Atmospheric Pressure Ionisation ("API") ion source; (vii) a Desorption Ionisation on Silicon ("DIOS") ion source; (viii) an Electron Impact ("EI") ion source; (ix) a Chemical Ionisation ("CI") ion source; (x) a Field Ionisation ("FI") ion source; (xi) a Field Desorption ("FD") ion source; (xii) an Inductively Coupled Plasma ("ICP") ion source; (xiii) a Fast Atom Bombardment ("FAB") ion source; (xiv) a Liquid Secondary Ion Mass Spectrometry ("LSIMS") ion source; (xv) a Desorption Electrospray Ionisation ("DESI") ion source; (xvi) a Nickel-63 radioactive ion source; (xvii) an Atmospheric Pressure Matrix Assisted Laser Desorption Ionisation ion source; (xviii) a Thermospray ion source; (xix) an Atmospheric Sampling Glow Discharge Ionisation ("ASGDI") ion source; (xx) a Glow Discharge ("GD") ion source; (xxi) an Impactor ion source; (xxii) a Direct Analysis in Real Time ("DART") ion source; (xxiii) a Laserspray Ionisation ("LSI") ion source; (xxiv) a Sonicspray Ionisation ("SSI") ion source; (xxv) a Matrix Assisted Inlet Ionisation ("MAII") ion source; (xxvi) a Solvent Assisted Inlet Ionisation ("SAII") ion source; (xxvii) a Desorption Electrospray Ionisation ("DESI") ion source; (xxviii) a Laser Ablation Electrospray Ionisation ("LAESI") ion source; and (xxix) a Surface Assisted Laser Desorption Ionisation ("SALDI") ion source. The spectrometer may comprise one or more continuous or pulsed ion sources.

The spectrometer may comprise one or more collision, fragmentation or reaction cells selected from the group consisting of: (i) a Collisional Induced Dissociation ("CID") fragmentation device; (ii) a Surface Induced Dissociation ("SID") fragmentation device; (iii) an Electron Transfer Dissociation ("ETD") fragmentation device; (iv) an Electron Capture Dissociation ("ECD") fragmentation device; (v) an Electron Collision or Impact Dissociation fragmentation device; (vi) a Photo Induced Dissociation ("PID") fragmentation device; (vii) a Laser Induced Dissociation fragmentation device; (viii) an infrared radiation induced dissociation device; (ix) an ultraviolet radiation induced dissociation device; (x) a nozzle-skimmer interface fragmentation device; (xi) an in-source fragmentation device; (xii) an in-source Collision Induced Dissociation fragmentation device; (xiii) a thermal or temperature source fragmentation device; (xiv) an electric field induced fragmentation device; (xv) a magnetic field induced fragmentation device; (xvi) an enzyme digestion or enzyme degradation fragmentation device; (xvii) an ion-ion reaction fragmentation device; (xviii) an ion-molecule reaction fragmentation device; (xix) an ion-atom reaction fragmentation device; (xx) an ion-metastable ion reaction fragmentation device; (xxi) an ion-metastable molecule reaction fragmentation device; (xxii) an ion-metastable atom reaction fragmentation device; (xxiii) an ion-ion reaction device for reacting ions to form adduct or product ions; (xxiv) an ion-molecule reaction device for reacting ions to form adduct or product ions; (xxv) an ion-atom reaction device for reacting ions to form adduct or product ions; (xxvi) an ion-metastable ion reaction device for reacting ions to form adduct or product ions; (xxvii) an ion-metastable molecule reaction device for reacting ions to form adduct or product ions; (xxviii) an ion-metastable atom reaction device for reacting ions to form adduct or product ions; and (xxix) an Electron Ionisation Dissociation ("EID") fragmentation device.

The spectrometer may comprise one or more mass filters selected from the group consisting of: (i) a quadrupole mass filter; (ii) a 2D or linear quadrupole ion trap; (iii) a Paul or 3D quadrupole ion trap; (iv) a Penning ion trap; (v) an ion trap; (vi) a magnetic sector mass filter; (vii) a Time of Flight mass filter; and (viii) a Wien filter.

The spectrometer may comprise a device or ion gate for pulsing ions; and/or a device for converting a substantially continuous ion beam into a pulsed ion beam.

The spectrometer may comprise a mass analyser selected from the group consisting of: (i) a quadrupole mass analyser; (ii) a 2D or linear quadrupole mass analyser; (iii) a Paul or 3D quadrupole mass analyser; (iv) a Penning trap mass analyser; (v) an ion trap mass analyser; (vi) a magnetic sector mass analyser; (vii) Ion Cyclotron Resonance ("ICR") mass analyser; (viii) a Fourier Transform Ion Cyclotron Resonance ("FTICR") mass analyser; (ix) an electrostatic mass analyser arranged to generate an electrostatic field having a quadro-logarithmic potential distribution; (x) a Fourier Transform electrostatic mass analyser; (xi) a Fourier Transform mass analyser; (xii) a Time of Flight mass analyser; (xiii) an orthogonal acceleration Time of Flight mass analyser; and (xiv) a linear acceleration Time of Flight mass analyser.

BRIEF DESCRIPTION OF THE DRAWINGS

Various embodiments will now be described, by way of example only, and with reference to the accompanying drawings in which.

DETAILED DESCRIPTION

Figure 1:
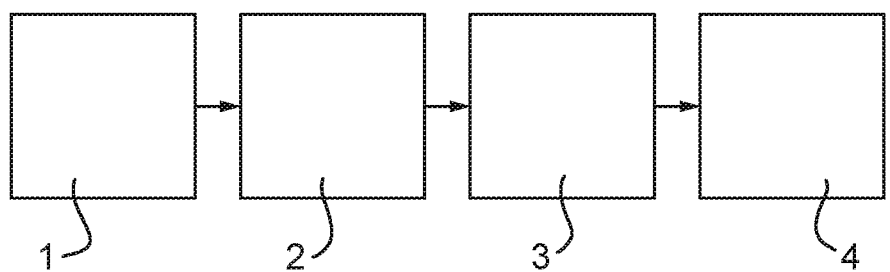
FIG. 1 is a schematic block diagram of a mass spectrometer.

FIG. 1 shows an example of a typical mass spectrometer suitable for operation with an ion detector according to the present disclosure. The mass spectrometer includes an ion source 1, one or more ion guiding and/or manipulating stages 2, and a mass analyser 3. Although FIG. 1 shows a linear arrangement, it will be appreciated that various geometries are possible. Also, whilst FIG. 1 shows an example of a mass spectrometer, it will be appreciated that the ion detectors according to the present disclosure may also find utility in other ion analysis instruments such as ion mobility spectrometers, or hybrid mass and ion mobility spectrometers.

Referring to FIG. 1, ions are thus generated by the ion source 1 and then transmitted through the ion guiding and/or manipulating stages 2 towards the mass analyser 3 where they are separated according to their mass to charge ratio and then passed into an ion detector 4 for detection. The mass spectrometer is capable of analysing both positive and negative ions. For example, the ion source 1 may be configured to generate positive and/or negative ions, and the instrument may then be configured to transmit, analyse and detect either positive or negative ions, e.g. by suitably configuring the potentials along the instrument. The ion detector must therefore be operable to detect both positive and negative ions.

Figure 2:
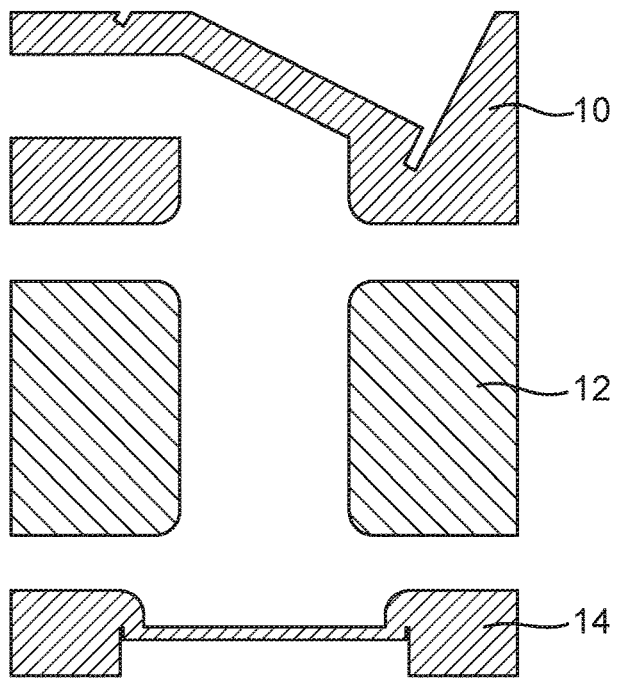
FIG. 2 shows schematically an example of an existing ion detector.

FIG. 2 shows an example of an existing dual-mode ion detector including a switchable dynode part 10, a ring dynode 12 that is held at a fixed negative potential and a phosphor part 14 that is held at a fixed at a fixed positive potential. These elements are all maintained in use at relatively high potentials, e.g., of the order kV. For example, in a typical arrangement, the dynode part 10 may be switchable between about +/−8 kV, the ring dynode 12 may be held at about −4.5 kV, and the phosphor part 14 held at about +9 kV.

In order to switch the ion detector shown in FIG. 2 between its positive and negative ion detecting modes, the potential applied to the dynode part 10 is set accordingly using a suitable (switchable) high voltage power supply (not shown).

For instance, in a positive ion detection mode, the dynode part 10 is set to a negative potential (e.g. −8 kV) and incoming positive ions initially strike this dynode part 10 creating secondary electrons which then strike the phosphor part 14 to generate a detection signal indicating that a positive ion had reached the detector. For example, the phosphor part 14 is typically coated with a suitable phosphorescent material, such as a P47 phosphor, or equivalent, such that a secondary electron that strikes the phosphor part 14 generates photons that can then be detected by a suitable photon detector (e.g. a photomultiplier tube). It will be appreciated that converting the electrons into photons in this way helps decouple the detector electronics from the higher voltages applied to the electrodes of the detector.

Thus, the secondary electrons, and photons, used to generate the detection signal, and hence the detection signal produced by the ion detector, are associated with a particular incoming ion.

On the other hand, in a negative ion detection mode, the dynode part 10 is instead set to a positive potential (e.g. +8 kV). The incoming negative ions striking this dynode part 10 now create secondary positive ions which then strike the ring dynode 12, thereby creating secondary electrons which then strike the phosphor part 14 and generate a signal associated with the incoming ion, e.g. in the same manner described above.

The detector shown in FIG. 2 thus relies on switching the polarity of the relatively high voltage that is applied to the dynode part 10. However, switching the polarity of the high voltage elements can be complicated, often requiring relatively complex (expensive) high voltage power supplies with relatively slow switching times, wherein the switching introduces large voltage transients. The typical size of such power supplies also means that these must typically be positioned outside of the detector vacuum chamber, requiring an expensive high voltage feed through to be provided.

Figure 3:
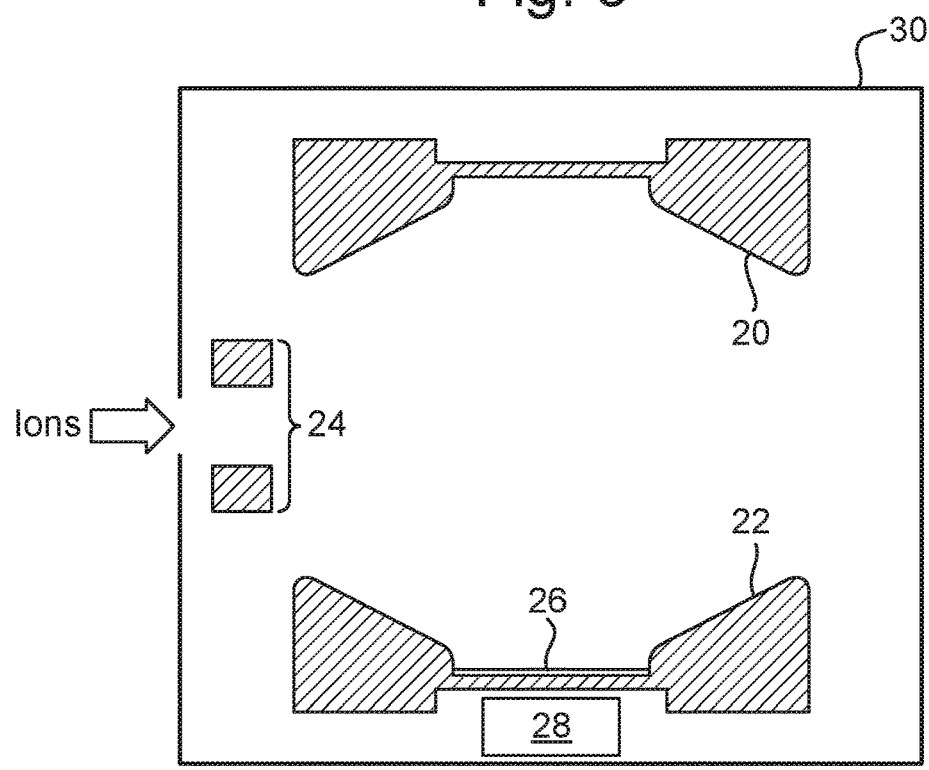
FIG. 3 shows schematically an example of an ion detector according to an embodiment.

FIG. 3 thus shows an example of an ion detector according to an embodiment. Here, the detector has two high voltage conversion electrodes (dynodes) in the form of the dynode part 20 and the phosphor part 22, which act to cause the desired ion-to-ion, or ion-to-electron, conversions, in a known fashion, and as described further below. However, now, these elements are both held at fixed potentials. For example, the dynode part 20 can be held at a fixed negative potential and the phosphor part 22 held at a fixed positive potential. In order to allow the detector to be switched between positive and negative ion detection modes, an entrance electrode 24, e.g. in the form of an extraction lens (here comprising a ring electrode having a central aperture through which ions pass into the detector), is provided at the entrance of the detector. By applying a suitable potential to the entrance electrode 24, the entrance electrode 24 is thus able to draw incoming ions into the ion detector.

For instance, ions will generally arrive at the ion detector along a central axis, as a collimated beam, e.g. from an upstream quadrupole device. If the entrance electrode 24 was not present, not all of the ions would be attracted into the detector due to the high field being present in the region between the conversion electrodes. For instance, where the potentials on the dynode part 20 and phosphor part 22 are fixed, depending on which part is closest to the entrance, there will be a net electric field at the ion entrance such that only ions of one polarity would pass into the detector (with ions of the other polarity experiencing a potential barrier). It would in principle be possible to arrange the detector to make this region attract positive or negative ions by changing the high voltages applied to the conversion electrodes, or even the distances between these elements, but this may require complex circuitry and may be impractical in the desired switching timescales.

The entrance electrode 24 shields the ions from this high field region and provides an attractive route into the detector. Thus, the polarity of the entrance electrode 24 is switched between operating modes to be attractive for ions of the desired polarity. As the ions pass by, or through, the entrance electrode 24, the ions are then subject to the high fields and move off-axis towards the relevant conversion electrode, i.e. the dynode part 20 or the phosphor part 22 depending on their polarity.

As shown in FIG. 3, the arrangement of the dynode part 20 and the phosphor part 22 is such that these parts face each other on either side of the entrance electrode 24. The phosphor part 22 comprises a central flat portion which is coated using a suitable phosphor material 26 that acts as a photo emissive electron detector. For example, the phosphor material 26 is generally arranged to emit photons in response to electrons striking upon it. The phosphor material 26 may be provided on a transparent slide so that these photons can then be detected, e.g. using a suitable photo multiplier tube arrangement 28. The phosphorous material 26 may comprise any suitably phosphorescent material. For example, may comprise conventional P47 phosphor. However, other suitably phosphorescent materials may also be used. Equivalently, a fluorescent material can be provided. In the example shown in FIG. 3, the photo multiplier tube arrangement 28 is contained within the detector housing 30. However, it is also contemplated that a light guide may be used to transfer photons out of the housing onto a suitable light detector.

The dynode part 20 and the phosphor part 22 are both generally shaped to define the trajectories of the ions (and electrons) to be detected and particularly to direct the ion and electrons in the desired manner towards the phosphor material 26 provided on the flat part of the phosphor part 22.

For example, as shown in FIG. 3, the dynode part 20 and the phosphor part 22 may be substantially symmetric about the axis of the entrance electrode 24 (which is the axis along which ions enter the ion detector), and may each comprise angled portions that act to guide the ions (electrons) as desired.

Figure 4:
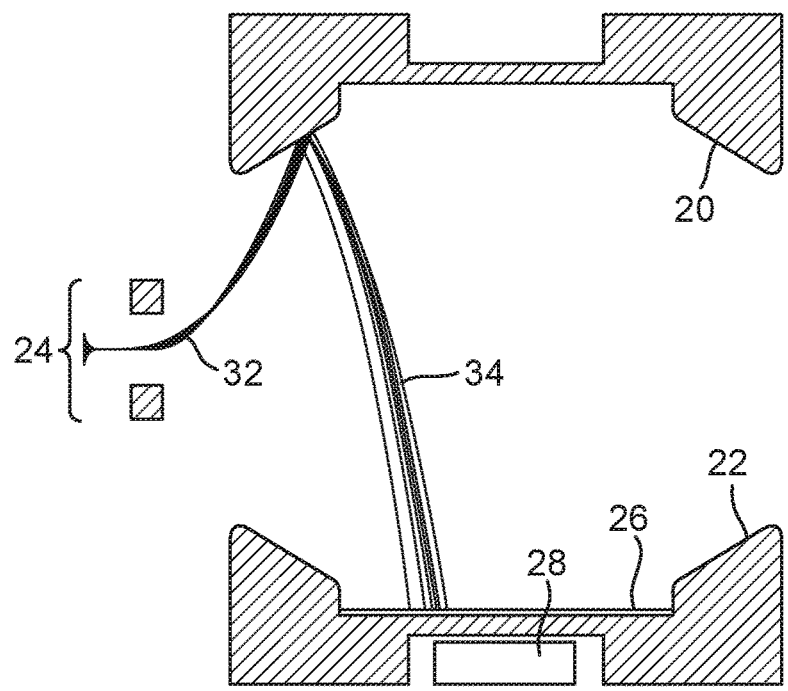
FIG. 4 shows schematically an example of the ion detector of FIG. 3 operating in a positive ion detection mode.

For example, in a positive ion detection mode, a negative potential is applied to the entrance electrode 24 to cause incoming positive ions to be drawn into the detector. As the positive ions pass the entrance electrode 24 into the high field region of the detector, the positive ions initially strike the dynode part 20, creating secondary electrons which then strike the phosphorous material 26 in the flat detecting portion of the phosphor part 22. The secondary electron strikes on the phosphorous material 26 in turn create photons which can then be detected suitably using a suitable photo sensitive detector such as a photo multiplier tube 28. A typical ion trajectory in the positive ion mode is illustrated in FIG. 4 wherein incoming positive ions 32 are converted to secondary electrons 34 and then detected.

Figure 5:
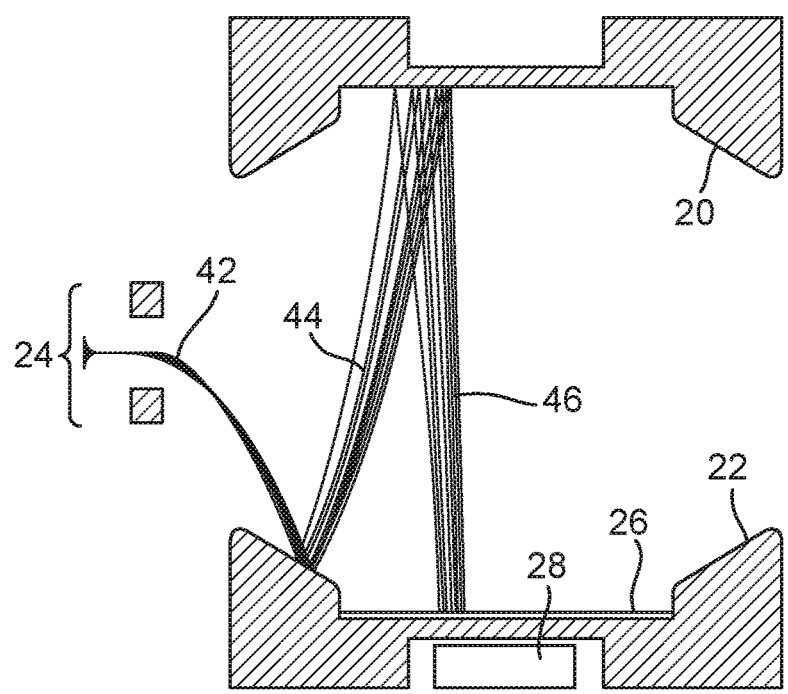
FIG. 5 shows schematically an example of the ion detector of FIG. 3 operating in a negative ion detection mode

On the other hand, when operating in a negative ion detection mode, a positive potential is applied to the entrance electrode 24 is such that the incoming negative ions are drawn into the detector where they are then caused to initially strike the angled portions of the phosphor part 22, creating secondary positive ions which are then caused to strike the dynode part 20 to create secondary electrons which then strike the phosphorous material 26 in the flat detecting portion of the phosphor part 22 and can be detected in the manner described above. A typical ion trajectory in the negative ion mode is illustrated in FIG. 5 wherein incoming negative ions 42 are converted to secondary positive ions 44 which are in turn converted to secondary electrons 46 and then detected.

This works well because the incoming ion beam is typically already radially confined, e.g. as a result of upstream focussing, so that ions incoming to the detector pass into the detector housing along a well-defined axis such that it is relatively straightforward to set up the entrance electrode 24 to attract incoming ions into the detector as desired. For instance, the entrance electrode 24 can be arranged inside the ion detector housing substantially at the ion entrance and aligned with this axis. So, a relatively simple electrostatic lens can be used as the entrance electrode 24, rather than any more complex arrangement, e.g. that may be required to deal with ions entering from a range of angles.

Thus, in FIG. 3, it is only the (relatively lower) potential applied to the entrance electrode 24 that needs to be switched in order to switch between positive and negative ion modes. This means that the relatively high potentials on the dynode part 20 and phosphor 22 can be kept constant. This allows the use of single polarity power supplies for the high voltages that are applied to these parts, which are typically much cheaper and smaller than fast-switching high voltage supplies. Also, because the high voltage supplies are not switched, they consume less power. This may allow the supplies to be placed inside a vacuum, for instance, removing the need for an expensive high voltage feed through.

Also, a low voltage element, such as the entrance electrode 24, can also be switched much faster than a typical high voltage power supply (and is typically more stable when switching, with smaller voltage transients). The polarity switching speed of the detector can thus also be increased (e.g. to sub-millisecond switching speeds).

The conversion electrodes may generally comprise metallic elements. However, the surfaces of the conversion electrodes may be coated with a suitable material to facilitate the desired ion-to-ion and ion-to-electron conversions. Also, because the dynode part 20 is always used for the initial conversion of positive ions, and the phosphor part 22 for the conversion of negative ions, unlike in FIG. 2 where the dynode part 10 is used for the initial conversion in both modes, these surfaces can be better optimised for these conversions. This may allow higher quantum efficiency conversions, and therefore higher detector sensitivity.

Figure 6:
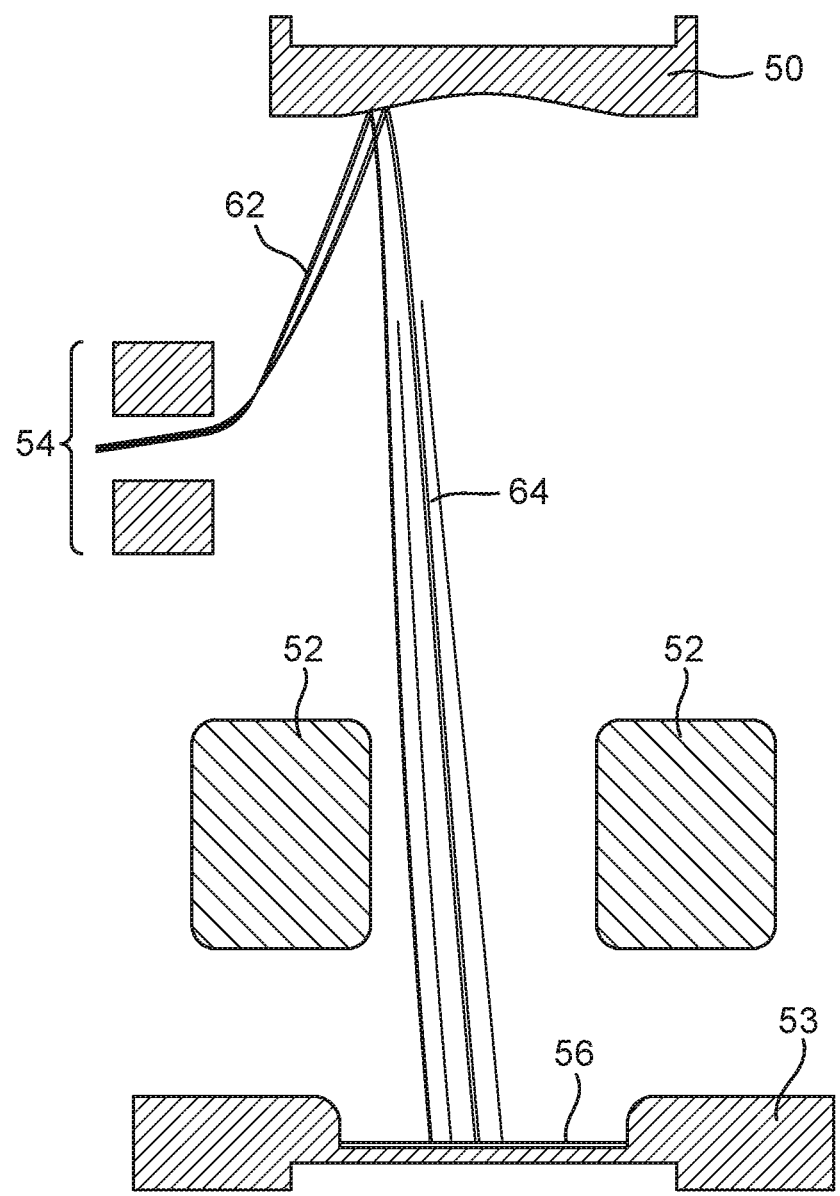
FIG. 6 shows schematically an example of an ion detector according to another embodiment operating in a positive ion detection mode.
Figure 7:
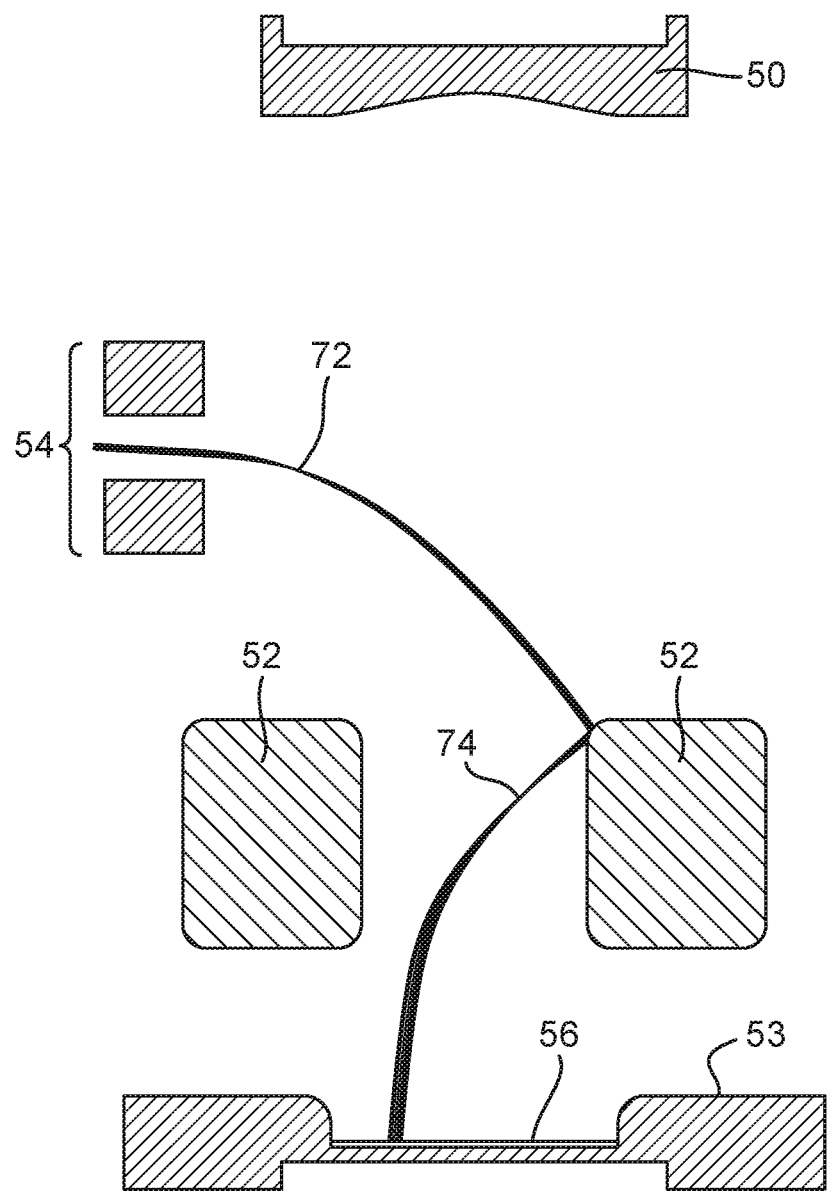
FIG. 7 shows schematically an example of the ion detector of FIG. 6 operating in a negative ion detection mode.

FIGS. 6 and 7 show another example of an ion detector according to an alternative embodiment. Here, instead of providing phosphorous material 26 on a flat detecting portion of the phosphor part 22, as in the embodiment described above, the phosphorous material 56 is coated on a separate electron detecting surface 53.

Thus, in a similar manner described above, incoming ions are drawn in through an annular entrance electrode 54 and then caused to either strike a dynode part 50 that is maintained in use at a negative voltage or an annular electrode 52 that is maintained in use at a positive voltage. For example, the dynode part 50 may be held at a negative voltage of −8 kV, and the annular electrode 52 may be maintained at a positive voltage of +8 kV. The electron detecting surface 53 may then be held at a higher positive voltage, e.g. of about +15 kV.

FIG. 6 shows the ion detector in positive ion detecting mode. When in positive ion mode, the ion detector behaves in a similar manner to the positive ion mode of the ion detector shown in FIG. 3. A relatively small negative potential (e.g. of −200 V) is applied to the entrance electrode 54 to cause incoming positive ions 62 to be drawn into the detector. As the positive ions 62 pass the entrance electrode 54 into the high field region of the detector, the positive ions 62 initially strike the dynode part 50, creating secondary electrons 64.

The secondary electrons 64 are then drawn through the annular electrode 52 towards the phosphorous material 56 on the detecting surface 53, e.g. as a result of the detecting surface 53 being held at a higher positive voltage than the annular electrode 52.

In the same manner described above, the secondary electron strikes on the phosphorous material 56 in turn create photons which can then be detected using a suitable photo sensitive detector, e.g. including a photo multiplier tube 28 described above.

In negative ion detecting mode, as shown in FIG. 7, a positive potential (e.g. +200 V) is applied to the entrance electrode 54 to cause incoming negative ions 72 to be drawn into the detector. The negative ions 72 pass into the high field region of the detector and are caused to initially strike the annular electrode 52, thereby creating secondary electrons 74. These secondary electrons 74 in turn strike the phosphorous material 56 due to the higher potential applied to the detecting surface 53 and the resulting photons are detected in the manner described above.

Although in the embodiments described above it is described that negative ions are initially converted either into secondary positive ions or secondary electrons, it is noted that a single negative ion may in some cases create a combination of secondary positive ions and secondary electrons. In that case the detector may be arranged, by controlling the relative arrangement of the electrodes, to detect the secondary positive ions (as in FIG. 5), to detect the secondary electrons directly (as in FIG. 7), or to detect a combination of both. It will be understood that whether negative ions are primarily converted into secondary position ions or secondary electrons, or both, may be controlled, e.g. by providing an appropriate surface coating or surface finish on the electrode, as is generally known in the art.

Thus, although the present invention has been described with reference to various embodiments, it will be understood by those skilled in the art that various changes in form and detail may be made without departing from the scope of the invention as set forth in the accompanying claims.

The invention claimed is:

1. A dual-mode ion detector for a mass and/or ion mobility spectrometer, wherein the ion detector is switchable between a first mode for detecting positive ions and a second mode for detecting negative ions, the detector comprising:
 an ion entrance;
 a first conversion electrode that is maintained, in use in both the first mode and the second mode, at a negative potential and arranged for converting incident positive ions into secondary electrons;
 a second conversion electrode that is maintained, in use in both the first mode and the second mode, at a positive potential and arranged for converting incident negative ions into secondary positive ions and/or secondary electrons;
 an electron detecting surface; and
 a set of electrodes defining an entrance electrode, wherein ions are provided to the ion detector through the ion entrance along a primary axis, and wherein the entrance electrode is arranged substantially at or near to the ion entrance and wherein the entrance electrode provides an initial focussing of ions provided to the ion detector through the ion entrance along the primary axis, the entrance electrode thus comprising an electrostatic lens
 wherein in the first mode a negative voltage is applied to the entrance electrode to draw incoming positive ions into the ion detector so that an incoming positive ion is drawn into the ion detector by the entrance electrode and is then accelerated towards and caused to initially strike the first conversion electrode to create secondary electrons,
 whereas in the second mode a positive voltage is applied to the entrance electrode to draw incoming negative ions into the ion detector so that an incoming negative ion is drawn into the ion detector and is then accelerated towards and caused to initially strike the second conversion electrode to create secondary positive ions and/or secondary electrons,
 wherein the first conversion electrode is arranged and shaped so that secondary electrons created by positive ions striking the first conversion electrode are then caused to strike the electron detecting surface, and wherein:
 (i) the second conversion electrode is arranged and shaped so that secondary positive ions created by negative ions striking the second conversion electrode are then caused to strike the first conversion electrode to create secondary electrons which are in turn caused to strike the electron detecting surface, and/or
 (ii) the second conversion electrode is arranged and shaped so that secondary electrons created by negative ions striking the second conversion electrode are then caused to strike the electron detecting surface.

2. The ion detector of claim 1, wherein the first and second conversion electrodes are maintained, in use, at fixed potentials.

3. The ion detector of claim 1, wherein the entrance electrode comprises a ring electrode.

4. The ion detector of claim 1, wherein the first conversion electrode and the second conversion electrode are arranged to substantially face each other on either side of the entrance electrode.

5. The ion detector of claim 1, wherein the second conversion electrode is arranged and shaped so that secondary positive ions created by negative ions striking a first, angled portion of the second conversion electrode are then caused to strike the first conversion electrode to create secondary electrons which are in turn caused to strike the electron detecting surface, wherein the electron detecting surface is provided adjacent to the first, angled portion of the second conversion electrode; or
 wherein the second conversion electrode is arranged and shaped so that secondary electrons created by negative ions striking the second conversion electrode are then caused to strike the electron detecting surface, wherein the electron detecting surface is separated from the second conversion electrode.

6. The ion detector of claim 1, wherein the electron detecting surface comprises a light emitting material arranged to emit photons in response to an electron striking the electron detecting surface, and wherein a photo sensitive detector such as a photomultiplier tube is provided to detect the emitted photons.

7. The ion detector of claim 1, comprising a controller configured to switch the ion detector between the first and second modes of operation by changing a voltage applied to the entrance electrode.

8. The ion detector of claim 1, comprising a vacuum housing, wherein the first and second conversion electrodes, the power supplies for the first and second conversion electrodes, the entrance electrode and the electron detecting surface are contained within the vacuum housing.

9. A method of detecting ions within a mass and/or ion mobility spectrometer using a dual-mode ion detector comprising: an ion entrance; a first conversion electrode arranged for converting incident positive ions into secondary electrons; a second conversion electrode arranged for converting incident negative ions into secondary positive ions and/or secondary electrons; an electron detecting surface; and a set of electrodes defining an entrance electrode, wherein ions are provided to the ion detector through the ion entrance along a primary axis, and wherein the entrance electrode is arranged substantially at or near to the ion entrance and the entrance electrode provides an initial focussing of ions provided to the ion detector through the ion entrance along the primary axis, the entrance electrode thus comprising an electrostatic lens,
 the method comprising:
 maintaining the first conversion electrode at a negative potential;
 maintaining the second conversion electrode at a positive potential; and
 operating the ion detector either in a first mode for detecting positive ions or a second mode for detecting negative ions, wherein:
 in the first mode a negative potential is applied to the entrance electrode so that incoming positive ions are drawn into the ion detector and caused to initially strike the first conversion electrode to create secondary electrons, the method comprising detecting the secondary electrons using the electron detecting surface; and
 in the second mode a positive potential is applied to the entrance electrode so that:
 (i) incoming negative ions are drawn into the ion detector and caused to initially strike the second conversion electrode to create secondary positive ions, the method comprising converting the secondary positive ions into secondary electrons using the first conversion electrode, and then detecting the secondary electrons using the electron detecting surface; and/or (ii) incoming negative ions are drawn into the ion detector caused to initially strike the second conversion electrode to create secondary electrons, the method comprising detecting the secondary electrons using the electron detecting surface.

10. The method of claim 9, comprising maintaining the first and second conversion electrodes at fixed potentials.

11. The method of claim 9, wherein the second conversion electrode is arranged and shaped so that secondary electrons created by negative ions striking the second conversion electrode are then caused to strike the electron detecting surface, wherein the electron detecting surface is separated from the second conversion electrode.

12. The method of claim 9, wherein the first conversion electrode and the second conversion electrode are arranged to substantially face each other on either side of the entrance electrode.

13. The method of claim 9, wherein the second conversion electrode is arranged and shaped so that secondary positive ions created by negative ions striking a first, angled part of the second conversion electrode are then caused to strike the first conversion electrode to create secondary electrons which are in turn caused to strike the electron detecting surface, wherein the electron detecting surface is provided adjacent to the first, angled part of the second conversion electrode.

14. The method of claim 9, wherein the electron detecting surface comprises a light emitting material arranged to emit photons in response to an electron striking the electron detecting surface, and wherein a photo sensitive detector such as a photomultiplier tube is provided to detect the emitted photons.

15. The method of claim 9, comprising switching the ion detector between the first and second modes of operation by changing a voltage applied to the entrance electrode.

16. The method of claim 9, wherein the ion detector comprises a vacuum housing, wherein the first and second conversion electrodes, the power supplies for the first and second conversion electrodes, the entrance electrode and the electron detecting surface are contained within the vacuum housing.

17. A mass and/or ion mobility spectrometer comprising a dual-mode ion detector for a mass and/or ion mobility spectrometer as claimed in claim 1.

18. A dual-mode ion detector for a mass and/or ion mobility spectrometer, wherein the ion detector is switchable between a first mode for detecting positive ions and a second mode for detecting negative ions, the detector comprising:

a first conversion electrode that is maintained, in use in both the first mode and the second mode, at a negative potential and arranged for converting incident positive ions into secondary electrons;

a second conversion electrode that is maintained, in use in both the first mode and the second mode, at a positive potential and arranged for converting incident negative ions into secondary positive ions and/or secondary electrons;

an electron detecting surface; and an entrance electrode for drawing ions into the ion detector, the entrance electrode comprising a ring electrode, wherein in the first mode a negative voltage is applied to the entrance electrode to draw incoming positive ions into the ion detector so that an incoming positive ion is drawn into the ion detector by the entrance electrode and is then accelerated towards and caused to initially strike the first conversion electrode to create secondary electrons, whereas in the second mode a positive voltage is applied to the entrance electrode to draw incoming negative ions into the ion detector so that an incoming negative ion is drawn into the ion detector and is then accelerated towards and caused to initially strike the second conversion electrode to create secondary positive ions and/or secondary electrons, wherein the first conversion electrode is arranged and shaped so that secondary electrons created by positive ions striking the first conversion electrode are then caused to strike the electron detecting surface, and wherein:

(i) the second conversion electrode is arranged and shaped so that secondary positive ions created by negative ions striking the second conversion electrode are then caused to strike the first conversion electrode to create secondary electrons which are in turn caused to strike the electron detecting surface, and/or (ii) the second conversion electrode is arranged and shaped so that secondary electrons created by negative ions striking the second conversion electrode are then caused to strike the electron detecting surface.

19. A method of detecting ions within a mass and/or ion mobility spectrometer using the dual-mode ion detector of claim 18;

the method comprising:

maintaining the first conversion electrode at a negative potential;

maintaining the second conversion electrode at a positive potential; and operating the ion detector either in the first mode for detecting positive ions or the second mode for detecting negative ions, wherein:

in the first mode the negative potential is applied to the entrance electrode so that incoming positive ions are drawn into the ion detector and caused to initially strike the first conversion electrode to create secondary electrons, the method comprising detecting the secondary electrons using the electron detecting surface; and in the second mode the positive potential is applied to the entrance electrode so that:

(i) incoming negative ions are drawn into the ion detector and caused to initially strike the second conversion electrode to create secondary positive ions, the method comprising converting the secondary positive ions into secondary electrons using the first conversion electrode, and then detecting the secondary electrons using the electron detecting surface; and/or (ii) incoming negative ions are drawn into the ion detector caused to initially strike the second conversion electrode to create secondary electrons, the method comprising detecting the secondary electrons using the electron detecting surface.

* * * * *